United States Patent [19]

Ida et al.

[11] Patent Number: 4,676,114

[45] Date of Patent: Jun. 30, 1987

[54] SHIFT MECHANISM FOR CHANGE-SPEED GEARING IN POWER TRANSMISSION

[75] Inventors: Shuichiro Ida; Katsumi Shimizu, both of Toyota; Junichi Hotta, Kariya, all of Japan

[73] Assignees: Toyota Jidosha Kabushiki Kaisha, Toyota; Aisin Seiki Kabushiki Kaisha, Kariya, both of Japan

[21] Appl. No.: 763,252

[22] Filed: Aug. 7, 1985

[30] Foreign Application Priority Data

Aug. 10, 1984 [JP] Japan .................................. 59-168711

[51] Int. Cl.$^4$ ........................ B60K 20/10; B60K 20/08
[52] U.S. Cl. .................................... 74/335; 74/473 R
[58] Field of Search ............... 74/335, 473 R; 92/59, 92/133

[56] References Cited

U.S. PATENT DOCUMENTS

| | | | |
|---|---|---|---|
| 2,137,959 | 11/1938 | Turek | 74/335 X |
| 2,280,047 | 4/1942 | Nampa | 74/473 R |
| 3,944,013 | 3/1976 | La Pointe | 74/335 X |
| 4,258,741 | 3/1981 | Roger | 92/59 X |

FOREIGN PATENT DOCUMENTS

| | | | |
|---|---|---|---|
| 0174747 | 10/1983 | Japan | 74/335 |
| 2066909 | 7/1981 | United Kingdom | 74/473 R |

*Primary Examiner*—Leslie Braun
*Assistant Examiner*—Dirk Wright
*Attorney, Agent, or Firm*—Oblon, Fisher, Spivak, McClelland & Maier

[57] ABSTRACT

A shift mechanism for a change-speed gearing in a power transmission which includes a pneumatic or hydraulic actuator, a shift rod axially slidably carried on a support structure and operatively connected at a first end thereof with the actuator for reciprocating movement, and a mechanism for selectively establishing a drive power gear train in the transmission in response to the reciprocating movement of the shift rod. The support structure is formed at one side thereof with a cylindrical portion in which an axial bore is formed coaxially with the shift rod to contain a second end of the shift rod, and a plug is detachably threaded into the cylindrical portion of the support structure to close the axial bore. The plug is associated with a retainer element for retaining the shift rod in its rearward position by engagement with a second end of the shift rod.

2 Claims, 5 Drawing Figures

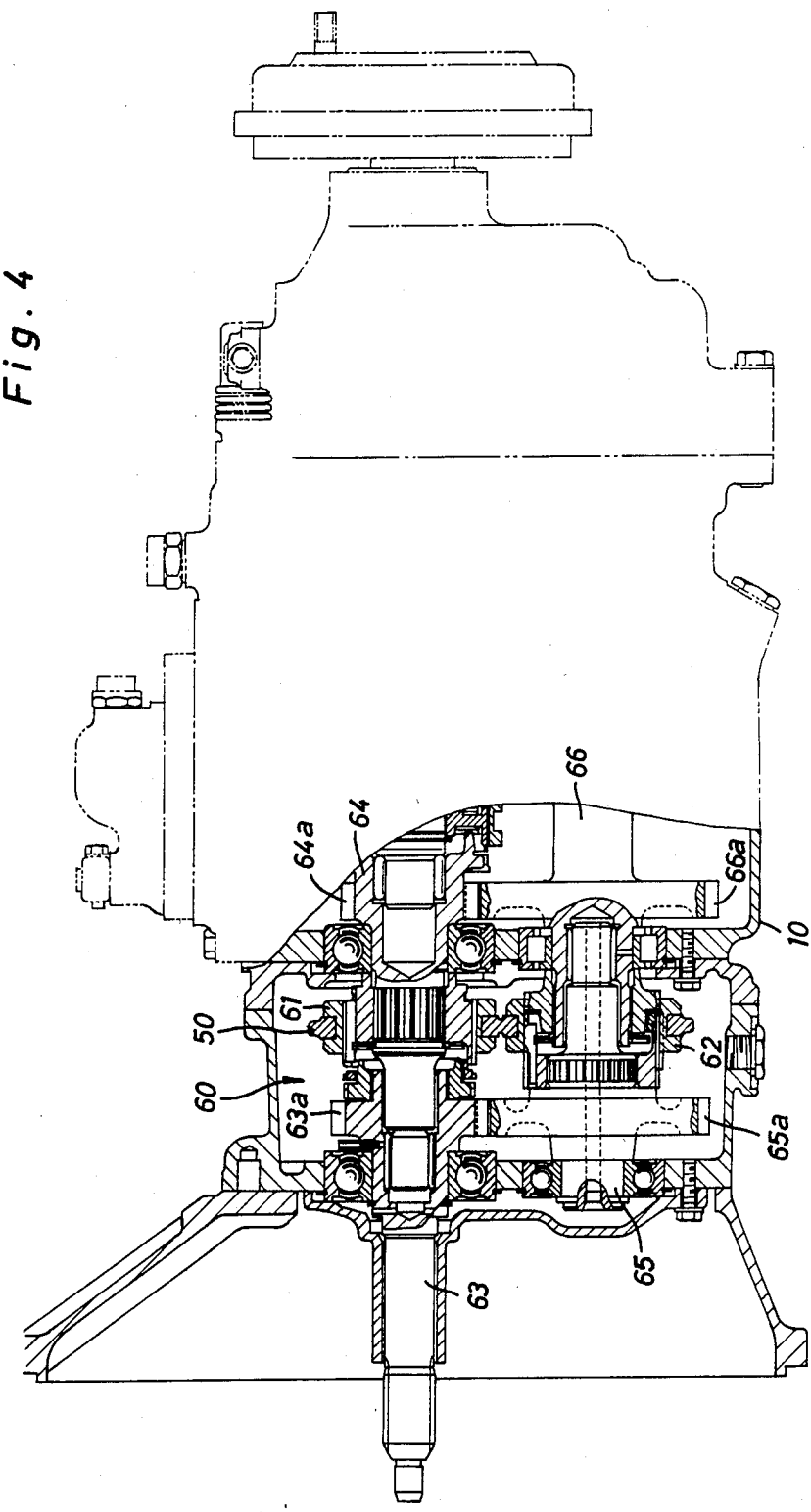

SHIFT MECHANISM FOR CHANGE-SPEED GEARING IN POWER TRANSMISSION

BACKGROUND OF THE INVENTION

1. FIeld of the Invention

The present invention relates to a shift mechanism for a change-speed gearing in a power transmission, and more particularly to a pneumatically or hydraulically operated shift mechanism for a change-speed gearing in a power transmission which includes a pneumatic or hydraulic acuator, a shift rod axially slidably carried on a support structure and operatively connected to the actuator for reciprocating movement, and means for selectively establishing a drive power gear train in the transmission in response to the reciprocating movement of the shift rod.

2. Description of the Prior Art

In such a conventional shift mechanism as described above, it is difficult to repair a control system for the pneumatic or hydraulic actuator upon the occurrence of problems in its operation or when damage to the same has occurred. It is, therefore, necessary to drive the vehicle to a well-equipped service shop or factory for repairing the problems with or the damage to the control system. In such a situation, it has been, however, experienced that the shift rod is unexpectedly displaced from its shifted position to an intermediate position in spite of the provision of a detent mechanism associated therewith. This results in trouble in operation of the transmission.

SUMMARY OF THE INVENTION

It is, therefore, a primary object of the present invention to provide a pneumatically or hydraulically operated shift mechanism wherein the shift rod can be firmly retained in its shifted position in the occurrence of problem with or damage to the control system for the actuator.

According to the present invention there is provided a shift mechanism for a change-speed gearing in a power transmission, which comprises a pneumatic or hydraulic actuator, a shift rod axially slidable carried on a support structure and operatively connected at one end thereof with the actuator for reciprocating movement, and means for selectively establishing a drive power gear train in the transmission in response to the reciprocating movement of the shift rod, and wherein the support structure is formed at one side thereof with an axial bore which is arranged coaxially with the shift rod to contain the other end of the shift rod, a plug is detachably threaded into the one side of the support structure to close the axial bore, and retainer means associated with the plug to retain the shift rod in its rearward position by engagement with the other end of the shift rod when the plug is removed and fastened again in place.

BRIEF DESCRIPTION OF THE DRAWINGS

Other objects, features and attendant advantages of the present invention will be more fully appreciated as the same becomes better understood from the following detailed description when considered in connection with the accompanying drawings in which like reference numerals designate like or corresponding parts throughout the several views and wherein:

FIG. 4 is a sectional view taken along line IV—IV in FIG. 2 illustrating an auxiliary transmission associated with the power transmission.

DESCRIPTION OF THE PREFERRED EMBODIMENT

Figure 1:
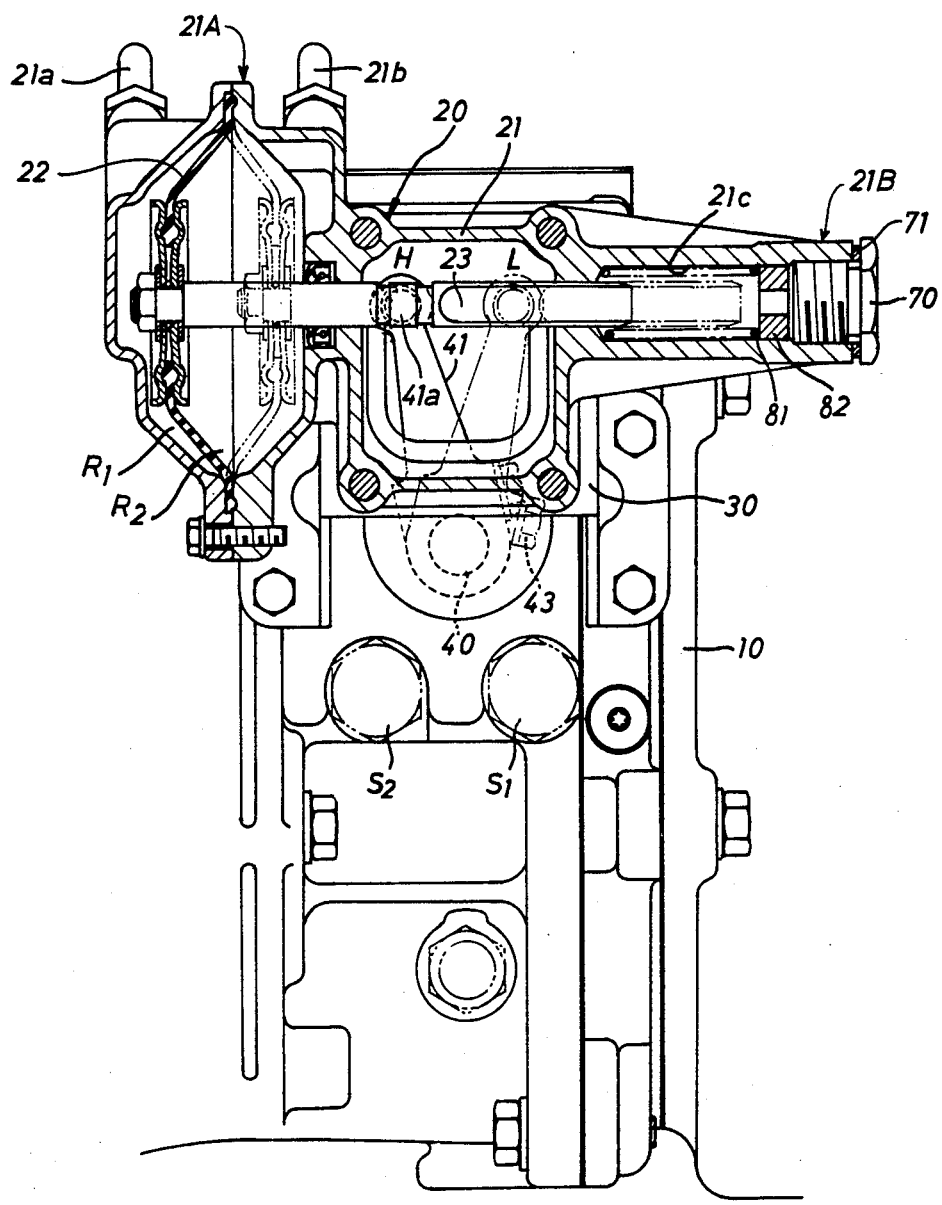
FIG. 1 is a side view partly in section of a pneumatically operated shift mechanism for a change-speed gearing in a power transmission in accordance with the present invention.
Figure 2:
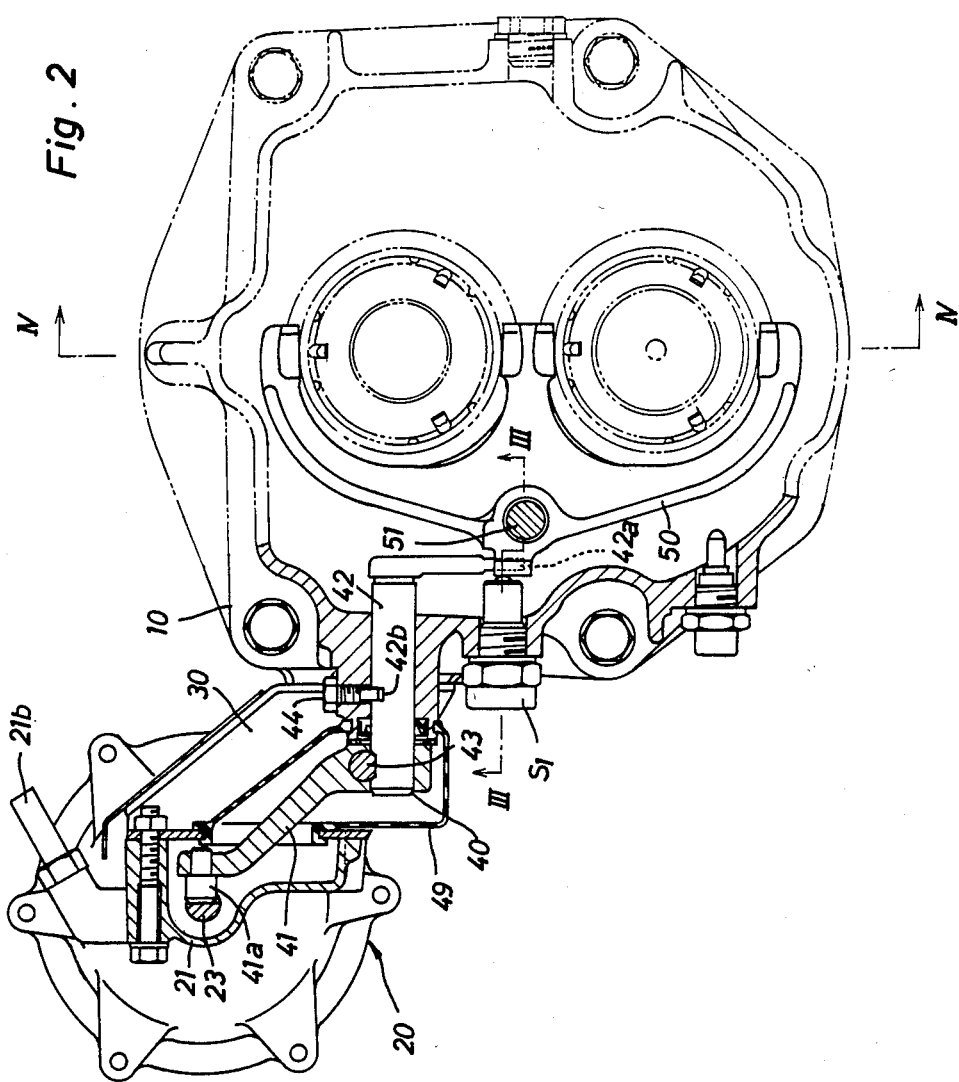
FIG. 2 is a sectional view illustrating a shift arm assembly in the shift mechanism in relation to a shift fork in the power transmission.

Referring now to FIGS. 1-4 of the drawings, there is illustrated a pneumatically operated shift mechanism for a change-speed gearing in a power transmission in accordance with the present invention. As shown in FIGS. 1 and 2, the pneumatically operated shift mechanism includes a pneumatic actuator 20 mounted on one side of a transmission housing 10 by means of a bracket 30, a shift arm assembly 40 rotatably mounted on a side wall of the transmission housing 10 to be operated by the pneumatic actuator 20, and a shift fork 50 mounted on a fork shaft 51 to be shifted by the shift arm assembly 40.

The pneumatic actuator 20 comprises a casing assembly 21A integral with a support structure 21 fixedly mounted on the transmission housing 10 by means of the bracket 30, a diaphragm 22 assembled within the casing assembly 21A to subdivide the interior of casing assembly 21A into a pair of chambers $R_1$ and $R_2$ and a shift rod 23 in the form of a piston rod axially slidably carried on the support structure 21 and conneced at the left end thereof with the diaphragm 22. The casing assembly 21A is provided thereon with a pair of ports 21a and 21b which are respectively communicated with the chambers $R_1$ and $R_2$ and arranged to be selectively connected to positive and negative pressure sources by way of a changeover valve (not shown) in a usual manner. When the changeover valve is operated by the operator to connect the port 21a to the positive pressure source and to connect the port 21b to the negative pressure source, the diaphragm 22 is moved rightward by the difference in pressure between the chambers $R_1$ and $R_2$ to effect forward movement of the shift rod 23. When the changeover valve is switched over by the operator to connect the port 21a to the negative pressure source and to connect the port 21b to the positive pressure source, the diaphragm 22 is moved leftward by the difference in pressure between the chambers $R_1$ and $R_2$ to effect backward movement of the shift rod 23.

The shift rod 23 is engaged at its intermediate portion with the upper end 41a of a first arm 41 of the shift arm assembly 40 to effect clockwise movement of the first arm 41 in its forward movement and to effect counterclockwise movement of the first arm 41 in its rearward movement. As shown in FIG. 2, the shift arm assembly 40 includes a second arm 42 integral with a support shaft rotatably mounted on the side wall of transmission housing 10 and connected with the lower end of first arm 41 by means of a connecting bolt 43. The support shaft of second arm 42 is formed at its intermediate portion with a circumferential groove 42b which is engaged with the inner end of an upright bolt 44 threaded into the transmission housing 10 to restrict axial movement of the second arm 42 and to permit rotary movement of the second arm 42 in a predetermined angular extent. The second arm 42 is engaged at its lower end 42a with the shift fork 50 to effect leftward movement of the shift fork 50 in clockwise direction movement of the first arm 41 and to effect rightward movement of the shift fork 50 in counterclockwise direction movement of the first arm 41. In addition, the first arm 41 is contained within a boot 49 coupled with the casing 21 and the side wall of transmission housing 10.

Figure 3:
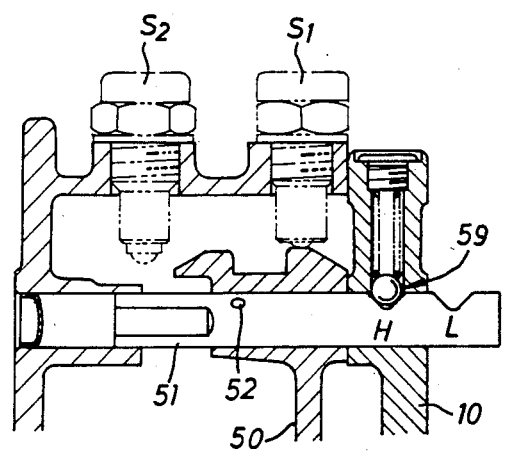
FIG. 3 is a sectional view taken along line III—III in FIG. 2.

As shown in FIGS. 2, 3 and 4, the shift fork 50 is formed approximately in an E-letter shape and engaged with a pair of shift sleeves 61 and 62 in an auxiliary transmission 60 assembled within the transmission housing 10. The shift fork 50 is fixed to the fork shaft 51 by means of a pin 52, which fork shaft 51 is axially slidably carried on the transmission housing 10. Mounted on the side wall of transmission housing 10 are a ball-detent mechanism 59 and a pair of position sensor switches $S_1$ and $S_2$. The ball-detent mechanism 59 is arranged to resiliently retain the fork shaft 51 in a high speed position H or a low speed position L. The position sensor switches $S_1$ and $S_2$ are arranged to detect the position of shift fork 50 by engagement therewith.

When the fork shaft 51 is retained in the high speed position H, the shift fork 50 is positioned to disconnect an input shaft 63 of the auxiliary transmission 60 from an intermediate shaft 64 and to connect auxiliary shafts 65 and 66 to each other for establishing a high speed gear train. The input shaft 63 has an input gear 63a in mesh with a gear 65a integral with the auxiliary shaft 65. The auxiliary shaft 66 has a gear 66a in mesh with a gear 64a integral with the intermediate shaft 64. When the fork shaft 51 is retained in the low speed position L, the shift fork 50 is positioned to disconnect the auxiliary shaft 65 from the auxiliary shaft 66 and to connect the input shaft 63 to the intermediate shaft 64 for establishing a low speed gear train. When the fork shaft 51 is slightly displaced leftward from the high speed position H or rightward from the low speed position L, the power transmission between the input shaft 63 and the intermediate shaft 64 and between the auxiliary shafts 65 and 66 may not be effected.

In the above-described shift mechanism, the support structure 21 of pneumatic actuator 20 is integrally formed at its right end with a cylindrical portion 21B in which an axial bore 21c is formed coaxially with the piston rod 23. The axial bore 21c is closed by a plug 70 detachably threaded into the outer end of cylindrical portion 21B through an annular seal member 71. Contained within the axial bore 21c is a coil spring 81 which is arranged in surrounding relationship with the shift rod 23 to permit reciprocating movement of the shift rod 23 in normal operation of the pneumatic actuator 20 and is compressed by engagement at its one end with the inner end of axial bore 21c and at its other end with the inner end of plug 70 through an annular retainer 82.

Upon the occurrence of damage to control system for the pneumatic actuator 20 such as to the conduits in communication with the inlet and outlet ports 21a and 21b, the changeover valve or the diaphragm 22, the shift rod 23 of pneumatic actuator 20 will be unexpectedly displaced from its shifted position if applied with an external force. This will cause unexpected movement of the fork shaft 51 apart from the low speed position L or the high speed position H. In such a situation, the plug 70 is removed from the cylindrical portion 21B of support structure 21, and the annular retainer 82 and the coil spring 81 are removed from the axial bore 21c. Thereafter, the annular retainer 82 is inserted into the axial bore 21c so as to be engaged with the right end of shift rod 23, the coil spring 81 is inserted into the axial bore 21c so as to be engaged at its inner end with the annular retainer 82, and the plug 70 is threaded again into the cylindrical portion 21B of support structure 21 and fastened in place to compress the coil spring 81 at its inner end. Thus, the shift rod 23 is urged by the compressed coil spring 81 toward the backward position and is resiliently retained in place under the biasing force of spring 81 and the retention force of the ball-detent mechanism 59 such that the fork shaft 51 is firmly retained in the high speed position H to establish the high speed gear train between auxiliary shafts 65 and 66. This allows for driving the vehicle to a service shop or factory.

Figure 5:
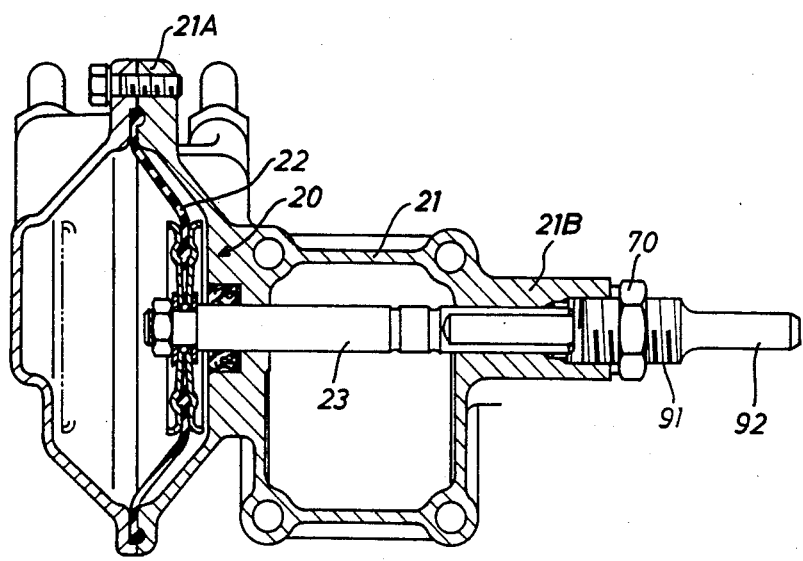
FIG. 5 is a sectional view illustrating a modification on the present invention.

In FIG. 5, there is partly illustrated a modification of the above-described shift mechanism, wherein the plug 70 is integrally formed at its outer end with a threaded portion 91 and a rod-like axial projection 92 extending outwardly therefrom, and wherein the coil spring 81 and the annular retainer 82 are eliminated, In normal operation of the pneumatic actuator 20, the plug 70 is fastened in place as shown in the figure to permit reciprocating movement of the shift rod 23. In the occurrence of damage of the control system of pneumatic actuator 20, the plug 70 is removed from the cylindrical portion 21B of support structure 21 and is reversed to insert the rod like projection 92 of plug 70 into the axial bore 21c. Thus, the threaded portion 91 of plug 70 is threaded into the cylindrical portion 21B of support structure 21 and fastened in place such that the shift rod 23 is pushed toward the backward position by engagement with the rod like projection 92 of plug 70 and retained in place.

Although in the above embodiment and modification, the shift rod 23 has been in the form of a piston rod connected to the diaphragm 22 of pneumatic actuator 20, it may be operatively connected to a pneumatic actuator mounted on the other portion of the transmission housing 10 for reciprocating movement. Alternatively, the pneumatic actuator may be replaced with a hydraulic actuator. Furthermore, it is to be noted that the present invention can be adapted to another type of transmission which includes a shift rod arranged to be operated by a pneumatic or hydraulic actuator substantially in the same manner as the shift rod 23 in the above-described embodiment.

What is claimed is:

1. A shift mechanism for a change-speed gearing in a power transmission, comprising:

an actuator mounted on a support structure;

a shift rod axially slidably carried on said support structure and operatively connected at a first end thereof with said actuator for reciprocating movement;

means for selectively establishing a drive power gear train in said transmission in response to the reciprocating movement of said shift rod, wherein said support structure is formed at one side thereof with a cylindrical portion in which an axial bore is formed coaxially with said shift rod to contain a second end of said shift rod;

a plug detachably threaded into the cylindrical portion of said support structure so as to close said axial bore, a coil spring disposed within the axial bore of said cylindrical portion and arranged in surrounding relationship with said shift rod in such a manner as to permit unbiased reciprocating movement of said shift rod within said coil spring; and a retainer interposed between said coil spring and said plug in such a manner that said coil spring is compressed by engagement at a first end thereof with the inner end of said axial bore and at a second end thereof with said retainer, wherein said retainer is further arranged to be engaged with the second end of said shift rod when said plug is removed and fastened again in place, and said coil spring is further arranged to retain said shift rod in a rearward position when interposed between said retainer and said plug.

2. A shift mechanism for a change-speed gearing in a power transmission, comprising an actuator mounted on a support structure;

a shift rod axially slidably carried on said support structure and operatively connected at one end thereof with said actuator for reciprocating movement;

means for selectively establishing a drive power gear train in said transmission in response to the reciprocating movement of said shift rod, wherein said support structure is formed at one side thereof with a cylindrical portion in which an axial bore is formed coaxially with said shift rod to contain a second end of said shift rod, a plug detachably threaded into the cylindrical portion of said support structure so as to close said axial bore, said plug being formed as one piece with an axial projection which is arranged to be inserted into the axial bore of said cylindrical portion when said plug is removed and fastened again in place in a reverse direction, said axial projection of said plug being further arranged to retain said shift rod in its rearward position when engaged with the second end of said shift rod.

* * * * *